United States Patent [19]

Jensen

[11] Patent Number: 6,133,401
[45] Date of Patent: *Oct. 17, 2000

[54] METHOD TO PREPARE PROCESSABLE POLYIMIDES WITH REACTIVE ENDGROUPS USING 1,3-BIS (3-AMINOPHENOXY) BENZENE

[75] Inventor: Brian J. Jensen, Williamsburg, Va.

[73] Assignee: The United States of America as represented by the Administrator of the National Aeronautics and Space Administration, Washington, D.C.

[ * ] Notice: This patent is subject to a terminal disclaimer.

[21] Appl. No.: 09/342,462

[22] Filed: Jun. 29, 1999

Related U.S. Application Data

[60] Provisional application No. 60/090,990, Jun. 29, 1998.

[51] Int. Cl.⁷ .................................................. C08G 73/10
[52] U.S. Cl. ...................... 528/170; 528/125; 528/128; 528/172; 528/173; 528/179; 528/183; 528/185; 528/188; 528/220; 528/229; 528/350; 528/353; 525/935; 524/600; 524/602; 524/608; 428/411.1; 428/425; 428/473.5
[58] Field of Search .................................. 528/125, 128, 528/172, 173, 179, 183, 185, 188, 220, 229, 350, 353, 170; 524/600, 602, 608; 525/935; 428/411.1, 425, 473.5

[56] References Cited

U.S. PATENT DOCUMENTS

| | | | |
|---|---|---|---|
| 5,567,800 | 10/1996 | Hergenrother et al. | 528/353 |
| 5,644,022 | 7/1997 | Jensen | 528/353 |
| 5,866,676 | 2/1999 | Jensen | 528/353 |

*Primary Examiner*—P. Hampton-Hightower
*Attorney, Agent, or Firm*—Hillary W. Hawkins

[57] ABSTRACT

Polyimide copolymers were obtained containing 1,3-bis(3-aminophenoxy)benzene (APB) and other diamines and dianhydrides and terminating with the appropriate amount of reactive endcapper. The reactive endcappers studied include but should not be limited to 4-phenylethynyl phthalic anhydride (PEPA), 3-aminophenoxy-4'-phenylethynylbenzophenone (3-APEB), maleic anhydride (MA) and nadic anhydride (5-norbornene-2,3-dicarboxylic anhydride, NA). Homopolymers containing only other diamines and dianhydrides which are not processable under conditions described previously can be made processable by incorporating various amounts of APB, depending on the chemical structures of the diamines and dianhydrides used. By simply changing the ratio of APB to the other diamine in the polyimide backbone, a material with a unique combination of solubility, Tg, Tm, melt viscosity, toughness and elevated temperature mechanical properties can be prepared. The copolymers that result from using APB to enhance processability have a unique combination of properties that include low pressure processing (200 psi and below), long term melt stability (several hours at 300° C. for the phenylethynyl terminated polymers), high toughness, improved solvent resistance, improved adhesive properties, and improved composite mechanical properties. These copolyimides are eminently suitable as adhesives, composite matrices, moldings, films and coatings.

8 Claims, No Drawings

METHOD TO PREPARE PROCESSABLE POLYIMIDES WITH REACTIVE ENDGROUPS USING 1,3-BIS (3-AMINOPHENOXY) BENZENE

CLAIM OF BENEFIT OF PROVISIONAL APPLICATION

Pursuant to 35 U.S.C. §119, the benefit of priority from provisional application 60/090,990, with a filing date of Jun. 29, 1998, is claimed for this non-provisional application.

ORIGIN OF THE INVENTION

The invention described herein was made by an employee of the United States Government and may be manufactured and used by or for the Government without the payment of any royalties thereon or therefor.

BACKGROUND OF THE INVENTION

1. Field of the Invention

The present invention relates to polyimide copolymers which contain 1,3-bis(3-aminophenoxy)benzene with reactive endgroups that are useful as adhesives, composite matrices, moldings, films and coatings.

2. Description of Related Art

Wholly aromatic polyimides are known for their exceptional thermal, thermo-oxidative and chemical resistance, but are generally difficult to process as structural adhesives or composite matrices. Several polyimides such as Kapton® (DuPont), PI-2080 (Dow Chemical, licensed to Lenzing), XU-218 (Ciba-Geigy), Ultem® (General Electric) and LaRC™-TPI (Mitsui Toatsu) are commercially available and used as fibers, films, moldings, adhesives or composite matrices.

Currently available equipment to process polyimides into useful parts are limited in their pressure and temperature capability and certain applications require co-curing of adhesives and composites with other structures such as foam or honeycomb. Because of the equipment limitations (especially autoclaves) and co-curing requirements, it is extremely important to provide materials that are processable at 250 psi or below and 371° C. or below. Because of the foams and honeycombs that are being proposed for use in some applications, reductions in pressure below 250 psi are also very significant.

While improved processing conditions are very important, the polyimides must also display better mechanical and adhesive properties to meet the needs of future applications. Especially important for these applications are properties measured at temperatures of 177° C. or slightly higher for use over long time periods at those elevated temperatures.

Thermoplastic polymers currently available are either difficult to process into high quality parts or have limited mechanical performance at the elevated temperatures for short or long periods of time. The related art that comes closest to meeting the needs of future applications is a thermoplastic polyimide known as LARC™-IA, as described by St. Clair and Progar in U.S. Pat. No. 5,147,966. However, this polyimide requires higher processing conditions than desired and/or provides lower mechanical and adhesive properties than desired, depending on the tests performed.

The incorporation of ethynyl groups in polyimides have been reported in the literature, typically as terminal groups to yield acetylene-terminated imide oligomers (ATI). Therimid-600, an oligoimide with acetylene end groups was first developed at the Hughes Aircraft Co. [N. Bilow, A. L. Landis and L. J. Miller, U.S. Pat. No. 3,845,018 (1974); A. L. Landis, N. Bilow, R. H. Boschan, R. E. Lawrence and T. J. Aponyi, *Polym. Prepr.*, 15, 537(1974); N. Bilow and A. L. Landis, *Natl. SAMPE Tech. Conf. Ser.*, 8, 94(1976)]. Several reviews on polyimides or acetylene-terminated prepolymers are published and discuss other acetylene containing polyimides [P. M. Hergenrother, in (H. Mark, ed.) *Encyclopedia of Polymer Science and Engineering*, 2nd. ed., vol. 1, John Wiley and Sons, Inc., New York, 61(1985); P. M. Hergenrother in (H. Mark, ed.) *Encyclopedia of Polymer Science and Engineering*, 2nd. ed., vol. 7, John Wiley and Sons, Inc., New York, 639(1987); T. Takekoshi, in (C. G. Overberger, ed.) *Advances in Polymer Science*, 2(1990)]. Polyimides containing pendent ethynyl groups have been reported but one reference contains an abstract only with no experimental details or polymer properties [F. W. Harris, S. M. Padaki and S. Varaprath, *Polym. Prepr.*, 21(1), 3(1980)]. Another disclosure on polyimides containing pendent ethynyl groups contains detailed experimental information and polymer properties [B. J. Jensen, P. M. Hergenrother and G. Nwokogu, *Polym. Prepr.*, 33(1), 914 (1992) and B. J. Jensen, P. M. Hergenrother and G. Nwokogu, *Polymer*, 34(3), 630, (1993)].

Maleimide terminated polymers (bismaleimides) have been known for many years [G. F. D. Alelio, U.S. Pat. No. 3,929,713 (1975)]. They are a leading class of thermosetting polyimides because of their excellent processability and balance of thermal and mechanical properties, making them extremely popular in advanced composites and electronics. Many different bismaleimides have been synthesized with a variety of connecting groups between the maleimide rings [D. Wilson, H. D. Stenzenberger and P. M. Hergenrother, Polyimides, Blackie & Son Ltd., Bishopbriggs, Glasgow, United Kingdom, 1990].

Norbornene terminated polyimides have also been known for many years [H. R. Lubowitz, U.S. Pat. No. 3,528,950 (1970)]. The norbornene groups reacts to form thermo-oxidatively stable polyimides which have found use as high temperature composite matrix resins [D. Wilson, H. D. Stenzenberger and P. M. Hergenrother, Polyimides, Blackie & Son Ltd., Bishopbriggs, Glasgow, United Kingdom, 1990].

An object of this invention is to provide polyimide copolymers of virtually any molecular weight terminated with reactive groups.

Another object is to provide polyimides terminated with reactive groups which can be processed at low pressures to provide polyimides with improved solvent resistance, modulus and elevated use temperatures.

Another object is to provide polyimide copolymers terminated with reactive groups of molecular weight between ~1000 and ~15000 g/mole.

Another object is to provide polyimide copolymers terminated with reactive groups of molecular weight between ~2500 and ~10000 g/mole.

Another object is to provide polyimides terminated with reactive groups with improved melt processability.

Another object is to provide a system that can be processed without the evolution of volatiles.

Another object is to provide a system that is melt stable at high temperatures.

Another object is to provide a system that has improved adhesive properties.

Another object is to provide a system that has improved composite properties.

Another object is to provide a system that has improved solvent resistance.

SUMMARY OF THE INVENTION

According to the present invention, polyimide copolymers were obtained containing 1,3-bis(3-aminophenoxy)benzene (APB) and other diamines and dianhydrides and terminating with the appropriate amount of reactive endcapper. The reactive endcappers studied include but should not be limited to 4-phenylethynyl phthalic anhydride (PEPA), 3-aminophenoxy-4'-phenylethynylbenzophenone (3-APEB), maleic anhydride (MA) and nadic anhydride (5-norbornene-2,3-dicarboxylic anhydride, NA). Homopolymers containing only other diamines and dianhydrides which are not processable under conditions described previously can be made processable by incorporating various amounts of APB, depending on the chemical structures of the diamines and dianhydrides used. Polyimides that are more rigid in nature require more APB to impart processability than polyimides that are less rigid in nature. Some of these more rigid polyimides may never reach low enough melt viscosity to be processed by methods such as resin transfer molding even with very high (>95%) loading levels of APB. The exact amount of APB required to impart processability is not predictable and is determined by the exact processing parameters and methods that the copolymers will see. For example, resin transfer molding requires lower melt viscosity than resin powder infusion, which requires lower melt viscosity than autoclave processing in composite preparation. The copolymers that result from using APB to enhance processability have a unique combination of properties that include low pressure processing (200 psi and below), long term melt stability (several hours at 300° C. for the phenylethynyl terminated polymers), high toughness, improved solvent resistance, improved adhesive properties, and improved composite mechanical properties. These copolyimides are eminently suitable as adhesives, composite matrices, moldings, films and coatings.

The advantage of these copolyimides terminated with reactive groups compared to other polyimides terminated with reactive groups is the unique combination of high mechanical properties and easy processing into useful parts. These copolyimides have excellent solvent resistance, high glass transition temperature and high modulus but are processable under low pressures when the appropriate amount of APB is utilized. This combination of properties is unique and is unexpected for these polyimides. The dianhydrides used herein contain a rigid structure which typically provides polyimides with poor processability. The addition of the highly flexible APB diamine provides the improved processability while the imide structure provides backbone stiffness, improved solvent resistance and improved mechanical properties. These properties are important for applications as films, coatings, moldings, adhesives and composites. If too little APB is incorporated into the polymer backbone, the resulting material is not processable under desired processing limitations. If too much APB is incorporated into the polymer backbone, the resulting material becomes highly flexible with a low glass transition temperature. Therefore, by simply changing the ratio of APB to the other diamine in the polyimide backbone, a material with a unique combination of solubility, Tg, Tm, melt viscosity, toughness and elevated temperature mechanical properties can be prepared. The exact level of APB required to obtain this optimum combination of properties is not predictable and is controlled by the application and the proposed processing method.

DESCRIPTION OF THE PREFERRED EMBODIMENTS

Imide oligomers terminated with reactive groups with a wide range of molecular weights (~1000 to ~15,000 g/mole) are readily prepared by offsetting the ratio of one monomer relative to the other by a calculated amount and adding an appropriate amount of endcapper containing the reactive group. The low molecular weight versions of these materials have better processability than the high molecular weight versions, however, the high molecular weight versions have better film forming capabilities than the low molecular weight versions. Copolymers with higher amounts of APB have better processability but lower Tgs while copolymers with lower amounts of APB have higher Tgs but poorer processability. Also, increasing amounts of APB will eliminate crystallinity in crystalline imides, which can be important in composite and adhesive properties. The amount of APB required to eliminate crystallinity is not predictable and depends on the other diamine and dianhydride used. Furthermore, copolymers with higher amounts of APB remain soluble after solution imidizing at 160° C. with toluene used to remove water while copolymers with lower amounts of APB often become insoluble after solution imidizing and precipitate from the reaction. Furthermore, imidized powders of copolymers with lower amounts of APB typically are insoluble in NMP at 25° C. after drying at >100° C. However, unexpectedly (because of the rigid imide unit) the imidized powders of some copolymers with higher amounts of APB are soluble in NMP at 25° C. after drying at >100° C. The temperatures and pressures used to process these materials are limited by the equipment available and the method of processing while the mechanical properties desired are based on current or future applications. The copolymers discussed herein have a unique combination of properties which allow them to be processed on currently available equipment at very low pressures but meet these desired mechanical properties. Therefore, the copolymers can be designed with the proper combination of properties for the desired application and processing method by controlling the ratio of the amine monomers, the molecular weight and the type of reactive endgroup used. Since the different endgroups have different reaction onset temperatures and different cure chemistries, a variety of properties can be systematically controlled. Specific examples follow.

EXAMPLE 1

Synthesis of 90/10 3,4'-ODA/APB//BPDA with 3-APEB @ 6000 g/mole

The following example illustrates the synthesis of a phenylethynyl-terminated imide cooligomer with theoretical number average molecular weight of 6000 g/mole. 3,4'-Oxydianiline (ODA) (24.974 mmole, 5.0010 g), 1,3-bis(3-aminophenoxy)benzene (APB) (2.7749 mmole, 0.8112 g), 3,3',4,4'-biphenyl tetracarboxylic dianhydride (BPDA) (30.00 mmole, 8.8267 g), 4-(3-aminophenoxy)-4'-phenylethynyl-benzophenone (3-APEB) (4.5012 mmole, 1.7529 g), and N-methylpyrrollidinone (NMP) (65 g) were added to a 250 mL three neck flask equipped with a mechanical stirrer, condenser, and nitrogen inlet. The reaction was stirred at 25° C. for 16 h to form the phenylethynyl-terminated polyamide acid ($\eta_{inh}$=0.31 dL/g, NMP at 25° C.) followed by adding toluene (40 mL) and heating at 160° C. for 24 h. A yellow precipitate formed during the heating.

After cooling, the yellow precipitate was poured into water, washed in boiling methanol and dried at 110° C. for 72 h to afford a yellow solid in >95% yield. The resulting phenylethynyl-terminated polyimide powder was insoluble in NMP at 25° C. The final Tg by DSC was 252° C., measured after curing 1 h at 350° C. A film cast from the polyamide acid solution and cured 1 h at 350° C. was unaffected by MEK, toluene, jet fuel, and hydraulic fluid.

EXAMPLE 2

Synthesis of 85/15 3,4'-ODA/APB//BPDA with 3-APEB @ 5000 g/mole

The following example illustrates the synthesis of a phenylethynyl-terminated imide cooligomer with theoretical number average molecular weight of 5000 g/mole. 3,4'-Oxydianiline (ODA) (23.199 mmole, 4.6456 g), 1,3-bis(3-aminophenoxy)benzene (APB) (4.094 mmole, 1.1968 g), 3,3',4,4'-biphenyl tetracarboxylic dianhydride (BPDA) (30.00 mmole, 8.8267 g), 4-(3-aminophenoxy)-4'-phenylethynyl-benzophenone (3-APEB) (5.412 mmole, 2.1077 g), N-methylpyrrollidinone (NMP) (67 g) were added to a 250 mL three neck flask equipped with a mechanical stirrer, condenser and nitrogen inlet. The reaction was stirred at 25° C. for 16 h to form the phenylethynyl-terminated polyamide acid ($\eta_{inh}$=0.31 dL/g, NMP at 25° C.) followed by adding toluene (40 mL) and heating at 160° C. for 24 h. A yellow precipitate formed during the heating. After cooling, the yellow precipitate was poured into water, washed in boiling methanol and dried at 110° C. for 72 h to afford a yellow solid in >95% yield. The resulting phenylethynyl-terminated polyimide powder was insoluble in NMP at 25° C. The final Tg by DSC was 251° C., measured after curing 1 h at 350° C. A film cast from the polyamide acid solution and cured 1 h at 350° C. was unaffected by MEK, toluene, jet fuel, and hydraulic fluid.

EXAMPLE 3

Synthesis of 80/20 3,4'-ODA/APB//BPDA with 3-APEB @ 5000 g/mole

The following example illustrates the synthesis of a phenylethynyl-terminated imide cooligomer with theoretical number average molecular weight of 5000 g/mole. 3,4'-Oxydianiline (ODA) (21.816 mmole, 4.3686 g), 1,3-bis(3-aminophenoxy)benzene (APB) (5.454 mmole, 1.5944 g), 3,3',4,4'-biphenyl tetracarboxylic dianhydride (BPDA) (30.00 mmole, 8.8267 g), 4-(3-aminophenoxy)-4'-phenylethynyl-benzophenone (3-APEB) (5.46 mmole, 2.1264 g), and N-methylpyrrollidinone (NMP) (68 g) were added to a 250 mL three neck flask equipped with a mechanical stirrer, condenser, and nitrogen inlet. The reaction was stirred at 25° C. for 16 h to form the phenylethynyl-terminated polyamide acid ($\eta_{inh}$=0.30 dL/g, NMP at 25° C.) followed by adding toluene (40 mL) and heating at 160° C. for 24 h. A precipitate formed during the cool down. After cooling, the greenish-yellow semi-solid was poured into water, washed in boiling methanol and dried at 110° C. for 72 h to afford a yellow solid in >95% yield. The resulting phenylethynyl-terminated polyimide powder was insoluble in NMP at 25° C. The final Tg by DSC was 243° C., measured after curing 1 h at 350° C. A film cast from the polyamide acid solution and cured 1 h at 350° C. was unaffected by MEK, toluene, jet fuel, and hydraulic fluid.

EXAMPLE 4

Synthesis of 70/30 3,4'-ODA/APB//BPDA with 3-APEB @ 5000 g/mole

The following example illustrates the synthesis of a phenylethynyl-terminated imide cooligomer with theoretical number average molecular weight of 5000 g/mole. 3,4'-Oxydianiline (ODA) (19.053 mmole, 3.8153 g), 1,3-bis(3-aminophenoxy)benzene (APB) (8.1655 mmole, 2.3871 g), 3,3',4,4'-biphenyl tetracarboxylic dianhydride (BPDA) (30.00 mmole, 8.8267 g), 4-(3-aminophenoxy)-4'-phenylethynyl-benzophenone (3-APEB) (5.5632 mmole, 2.1666 g), and N-methylpyrrollidinone (NMP) (69 g) were added to a 250 mL three neck flask equipped with a mechanical stirrer, condenser, and nitrogen inlet. The reaction was stirred at 25° C. for 16 h to form the phenylethynyl-terminated polyamide acid ($\eta_{inh}$=0.28 dL/g, NMP at 25° C.) followed by adding toluene (40 mL) and heating at 160° C. for 24 h. After cooling, the still soluble polyimide was poured into water, washed in boiling methanol and dried at 110° C. for 72 h to afford a yellow solid in >95% yield. The resulting phenylethynyl-terminated polyimide powder was soluble in NMP at 25° C. The final Tg by DSC was 236° C., measured after curing 1 h at 350° C. A film cast from the polyamide acid solution and cured 1 h at 350° C. was unaffected by MEK, toluene, jet fuel, and hydraulic fluid.

EXAMPLE 5

Synthesis of 60/40 3,4'-ODA/APB//BPDA with 3-APEB @ 5000 g/mole

The following example illustrates the synthesis of a phenylethynyl-terminated imide cooligomer with theoretical number average molecular weight of 5000 g/mole. 3,4'-Oxydianiline (ODA) (16.301 mmole, 3.2642 g), 1,3-bis(3-aminophenoxy)benzene (APB) (10.867 mmole, 3.1769 g), 3,3',4,4'-biphenyl tetracarboxylic dianhydride (BPDA) (30.00 mmole, 8.8267 g), 4-(3-aminophenoxy)-4'-phenylethynyl-benzophenone (3-APEB) (5.665 mmole, 2.2062 g), and N-methylpyrrollidinone (NMP) (67 g) were added to a 250 mL three neck flask equipped with a mechanical stirrer, condenser, and nitrogen inlet. The reaction was stirred at 25° C. for 16 h to form the phenylethynyl-terminated polyamide acid ($\eta_{inh}$=0.30 dL/g, NMP at 25° C.) followed by adding toluene (40 mL) and heating at 160° C. for 24 h. After cooling, the still soluble polyimide was poured into water, washed in boiling methanol and dried at 110° C. for 72 h to afford a yellow solid in >95% yield. The resulting phenylethynyl-terminated polyimide powder was soluble in NMP at 25° C. The final Tg by DSC was 231° C., measured after curing 1 h at 350° C. A film cast from the polyamide acid solution and cured 1 h at 350° C. was unaffected by MEK, toluene, jet fuel, and hydraulic fluid.

EXAMPLE 6

Synthesis of 50/50 3,4'-ODA/APB//BPDA with 3-APEB @ 5000 g/mole

The following example illustrates the synthesis of a phenylethynyl-terminated imide cooligomer with theoretical number average molecular weight of 5000 g/mole. 3,4'-Oxydianiline (ODA) (13.559 mmole, 2.7152 g), 1,3-bis(3-aminophenoxy)benzene (APB) (13.559 mmole, 3.9638 g), 3,3',4,4'-biphenyl tetracarboxylic dianhydride (BPDA) (30.00 mmole, 8.8267 g), 4-(3-aminophenoxy)-4'-phenylethynyl-benzophenone (3-APEB) (5.764 mmole, 2.2448 g), and N-methylpyrrollidinone (NMP) (67 g) were added to a 250 mL three neck flask equipped with a mechanical stirrer, condenser, and nitrogen inlet. The reaction was stirred at 25° C. for 16 h to form the phenylethynyl-terminated polyamide acid ($\eta_{inh}$=0.28 dL/g, NMP at 25° C.) followed by adding toluene (40 mL) and heating at 160° C. for 24 h. After cooling, the still soluble polyimide was poured into water, washed in boiling methanol and dried at 110° C. for 72 h to afford a yellow solid in >95% yield. The resulting phenylethynyl-terminated polyimide powder was soluble in NMP at 25° C. The final Tg by DSC was 229° C., measured after curing 1 h at 350° C. A film cast from the polyamide acid solution and cured 1 h at 350° C. was unaffected by MEK, toluene, jet fuel, and hydraulic fluid.

EXAMPLE 7

Synthesis of 95/5 3,4'-ODA/APB//BPDA with PEPA @ 5000 g/mole

The following example illustrates the synthesis of a phenylethynyl-terminated imide cooligomer with theoretical number average molecular weight of 5000 g/mole. 3,4'-Oxydianiline (ODA) (28.50 mmole, 5.7070 g), 1,3-bis(3-aminophenoxy)benzene (APB) (1.500 mmole, 0.4385 g), 3,3',4,4'-biphenyl tetracarboxylic dianhydride (BPDA) (27.345 mmole, 8.0456 g), 4-phenylethynyl phthalic anhydride (PEPA) (5.310 mmole, 1.3182 g), and N-methylpyrrollidinone (NMP) (62 g) were added to a 250 mL three neck flask equipped with a mechanical stirrer, condenser, and nitrogen inlet. The reaction was stirred at 25° C. for 16 h to form the phenylethynyl-terminated polyamide acid ($\eta_{inh}$=0.33 dL/g, NMP at 25° C.) followed by adding toluene (40 mL) and heating at 160° C. for 24 h. A yellow precipitate formed during the heating. After cooling, the yellow precipitate was poured into water, washed in boiling methanol and dried at 110° C. for 72 h to afford a yellow solid in >95% yield. The resulting phenylethynyl-terminated polyimide powder was insoluble in NMP at 25° C. After 1 h at 350° C., the final Tg was 280° C. by DSC and a Tm peak of 378° C. was measured. A film cast from the polyamide acid solution and cured 1 h at 350° C. was unaffected by MEK, toluene, jet fuel, and hydraulic fluid.

EXAMPLE 8

Synthesis of 85/15 3,4'-ODA/APB//BPDA with PEPA @ 5000 g/mole

The following example illustrates the synthesis of a phenylethynyl-terminated imide cooligomer with theoretical number average molecular weight of 5000 g/mole. 3,4'-Oxydianiline (ODA) (1.700 mole, 340.42 g), 1,3-bis(3-aminophenoxy)benzene (APB) (0.300 mole, 87.70 g), 3,3',4,4'-biphenyl tetracarboxylic dianhydride (BPDA) (1.8196 mole, 535.37 g), 4-phenylethynyl phthalic anhydride (PEPA) (0.3608 mole, 89.57 g), and N-methylpyrrollidinone (NMP) (1580 g) were added to a 3 L reaction kettle equipped with a mechanical stirrer, condenser, and nitrogen inlet. The reaction was stirred at 25° C. for 16 h to form the phenylethynyl-terminated polyamide acid ($\eta_{inh}$=0.29 dL/g, NMP at 25° C.) followed by adding toluene (40 mL) and heating at 160° C. for 24 h. A yellow precipitate formed during the heating. After cooling, the yellow precipitate was poured into water, washed in boiling methanol and dried at 110° C. for 72 h to afford a yellow solid in >95% yield. The resulting phenylethynyl-terminated polyimide powder was insoluble in NMP at 25° C. The final Tg of 263° C. was measured after 1 h at 350° C. A film cast from the polyamide acid solution and cured 1 h at 350° C. was unaffected by MEK, toluene, jet fuel, and hydraulic fluid.

EXAMPLE 9

Synthesis of 70/30 3,4'-ODA/APB//BPDA with PEPA @ 5000 g/mole

The following example illustrates the synthesis of a phenylethynyl-terminated imide cooligomer with theoretical number average molecular weight of 5000 g/mole. 3,4'-Oxydianiline (ODA) (21.00 mmole, 4.2052 g), 1,3-bis(3-aminophenoxy)benzene (APB) (9.00 mmole, 2.6310 g), 3,3',4,4'-biphenyl tetracarboxylic dianhydride (BPDA) (27.220 mmole, 8.0085 g), 4-phenylethynyl phthalic anhydride (PEPA) (5.56 mmole, 1.3802 g), and N-methylpyrrollidinone (NMP) (65 g) were added to a 250 mL three neck flask equipped with a mechanical stirrer, condenser, and nitrogen inlet. The reaction was stirred at 25° C. for 16 h to form the phenylethynyl-terminated polyamide acid ($\eta_{inh}$=0.29 dL/g, NMP at 25° C.) followed by adding toluene (40 mL) and heating at 160° C. for 24 h. After cooling, the still soluble polyimide was poured into water, washed in boiling methanol and dried at 110° C. for 72 h to afford a yellow solid in >95% yield. The resulting phenylethynyl-terminated polyimide was soluble in NMP at 25° C. The final Tg of 252° C. was measured after 1 h at 350° C. A film cast from the polyamide acid solution and cured 1 h at 350° C. was unaffected by MEK, toluene, jet fuel, and hydraulic fluid.

EXAMPLE 10

Synthesis of 85/15 3,4'-ODA/APB//BPDA with NA @ 9200 g/mole

The following example illustrates the synthesis of a norbornene(nadimide)-terminated imide cooligomer with theoretical number average molecular weight of 9200 g/mole. 3,4'-Oxydianiline (ODA) (8.500 mmole, 1.7021 g), 1,3-bis(3-aminophenoxy)benzene (APB) (1.500 mmole, 0.4385 g), 3,3',4,4'-biphenyl tetracarboxylic dianhydride (BPDA) (9.500 mmole, 2.7951 g), nadic anhydride (NA) (1.000 mmole, 0.1642 g), and N-methylpyrrollidinone (NMP) (20.4 g) were added to a 100 mL three neck flask equipped with a mechanical stirrer, condenser, and nitrogen inlet. The reaction was stirred at 25° C. for 16 h to form the norbornene(nadimide)-terminated polyamide acid ($\eta_{inh}$=0.40 dL/g, NMP at 25° C.) followed by adding toluene (20 mL) and heating at 160° C. for 24 h. A yellow precipitate formed during the heating. After cooling, the yellow precipitate was poured into water, washed in boiling methanol and dried at 110° C. for 72 h to afford a yellow solid in >95% yield. The resulting norbornene(nadimide)-terminated polyimide was insoluble in NMP. The final Tg of 262° C. was measured after 1 h at 316° C. A film cast from the polyamide acid solution and cured 1 h at 316° C. was unaffected by MEK, toluene, jet fuel, and hydraulic fluid.

EXAMPLE 11

Synthesis of 85/15 3,4'-ODA/APB//BPDA with MA @ 9200 g/mole

The following example illustrates the synthesis of a maleimide-terminated imide cooligomer with theoretical number average molecular weight of 9200 g/mole. 3,4'-Oxydianiline (ODA) (8.500 mmole, 1.7021 g), 1,3-bis(3-aminophenoxy)benzene (APB) (1.500 mmole, 0.4385 g), 3,3',4,4'-biphenyl tetracarboxylic dianhydride (BPDA) (9.500 mmole, 2.7951 g), maleic anhydride (MA) (1.000 mmole, 0.0981 g), and N-methylpyrrollidinone (NMP) (20.1 g) were added to a 100 mL three neck flask equipped with a mechanical stirrer, condenser, and nitrogen inlet. The reaction was stirred at 25° C. for 16 h to form the maleimide-terminated polyamide acid ($\eta_{inh}$=0.42 dL/g, NMP at 25° C.) followed by adding toluene (20 mL) and heating at 160° C. for 24 h. A yellow precipitate formed during the heating. After cooling, the yellow precipitate was poured into water, washed in boiling methanol and dried at 110° C. for 72 h to afford a yellow solid in >95% yield. The resulting maleimide-terminated polyimide was insoluble in NMP. The final Tg of 264° C. was measured after 1 h at 316° C. A film cast from the polyamide acid solution and cured 1 h at 316° C. was unaffected by MEK, toluene, jet fuel, and hydraulic fluid.

EXAMPLE 12

Synthesis of 50/50 4,4'-ODA/APB//PMDA with 3-APEB @ 9000 g/mole

The following example illustrates the synthesis of a phenylethynyl-terminated imide cooligomer with theoretical number average molecular weight of 9000 g/mole. 4,4'-Oxydianiline (4,4'-ODA) (9.535 mmole, 1.9093 g), 1,3-bis (3-aminophenoxy)benzene (APB) (9.535 mmole, 2.7874 g), pyrromellitic dianhydride (PMDA) (20.00 mmole, 4.3625 g), 4-(3-aminophenoxy)-4'-phenylethynyl-benzophenone (3-APEB) (1.860 mmole, 0.7244 g), and N,N-dimethylacetamide (DMAC) (39 g) were added to a 100 mL reaction kettle equipped with a mechanical stirrer, condenser, and nitrogen inlet. The reaction was stirred at 25° C. for 16 h to form the phenylethynyl-terminated polyamide followed by adding toluene (40 mL) and heating at 160° C. for 1.5 h. A yellow precipitate formed during the heating. After cooling, the yellow precipitate was poured into water, washed in boiling methanol and dried at 110° C. for 72 h to afford a yellow solid in >95% yield. The final Tg of 264° C. was measured after 1 h at 350° C.

EXAMPLE 13

Synthesis of 25/75 4,4'-ODA/APB//PMDA with 3-APEB @ 9000 g/mole

The following example illustrates the synthesis of a phenylethynyl-terminated imide cooligomer with theoretical number average molecular weight of 9000 g/mole. 4,4'-Oxydianiline (4,4'-ODA) (9.511 mmole, 1.9045 g), 1,3-bis (3-aminophenoxy)benzene (APB) (28.53 mmole, 8.3403 g), pyrromellitic dianhydride (PMDA) (40.00 mmole, 8.7249 g), 4-(3-aminophenoxy)-4'-phenylethynyl-benzophenone (3-APEB) (3.9200 mmole, 1.5266 g), and N-methylpyrollidinone (NMP) (77.4) were added to a 250 mL reaction kettle equipped with a mechanical stirrer, condenser, and nitrogen inlet. The reaction was stirred at 25° C. for 16 h to form the phenylethynyl-terminated polyamide followed by adding toluene (40 mL) and heating at 160° C. for 24 h. A dark gel formed during the heating and a yellow precipitate formed upon cooling to 100° C. After cooling, the yellow precipitate was poured into water, washed in boiling methanol and dried at 110° C. for 72 h to afford a yellow solid in >95% yield. The final Tg of 248° C. was measured after 1 h at 371° C.

EXAMPLE 14

Synthesis of 10/90 4,4'-ODA/APB//PMDA with 3-APEB @ 9000 g/mole

The following example illustrates the synthesis of a phenylethynyl-terminated imide cooligomer with theoretical number average molecular weight of 9000 g/mole. 4,4'-Oxydianiline (4,4'-ODA) (3.7894 mmole, 0.7606 g), 1,3-bis (3-aminophenoxy)benzene (APB) (34.186 mmole, 9.9936 g), pyrromellitic dianhydride (PMDA) (40.00 mmole, 8.7249 g), 4-(3-aminophenoxy)-4'-phenylethynyl-benzophenone (3-APEB) (4.032 mmole, 1.5702 g), and N-methylpyrollidinone (NMP) (84.2) were added to a 250 mL reaction kettle equipped with a mechanical stirrer, condenser, and nitrogen inlet. The reaction was stirred at 25° C. for 16 h to form the phenylethynyl-terminated polyamide followed by adding toluene (40 mL) and heating at 160° C. for 24 h. The solution remained soluble during heating and upon cooling to ~50° C. After cooling, the solution was poured into water, washed in boiling methanol and dried at 110° C. for 72 h to afford a yellow solid in >95% yield. The final Tg of 235° C. was measured after 1 h at 371° C.

EXAMPLE 15

Synthesis of 90/10 3,4'-ODA/APB//BTDA with 3-APEB @ 6000 g/mole

The following example illustrates the synthesis of a phenylethynyl-terminated imide cooligomer with theoretical number average molecular weight of 6000 g/mole. 3,4'-Oxydianiline (3,4'-ODA) (24.859 mmole, 4.9779 g), 1,3-bis (3-aminophenoxy)-benzene (APB) (2.7621 mmole, 0.8075 g), benzophenone tetracarboxylic dianhydride (BTDA) (30.00 mmole, 9.6670 g), 4-(3-aminophenoxy)-4'-phenylethynyl-benzophenone (3-APEB) (4.758 mmole, 1.8529 g), and N-methylpyrollidinone (NMP) (69.2) were added to a 250 mL reaction kettle equipped with a mechanical stirrer, condenser, and nitrogen inlet. The reaction was stirred at 25° C. for 16 h to form the phenylethynyl-terminated polyamide followed by adding toluene (40 mL) and heating at 160° C. for 24 h. A dark gel formed during the heating and a yellow precipitate formed upon cooling to 100° C. After cooling, the yellow precipitate was poured into water, washed in boiling methanol and dried at 110° C. for 72 h to afford a yellow solid in >95% yield. The final Tg was not detected but a Tm of 404° C. was measured after 1 h at 350° C.

EXAMPLE 16

Synthesis of 50/50 3,4'-ODA/APB//BTDA with 3-APEB @ 6000 g/mole

The following example illustrates the synthesis of a phenylethynyl-terminated imide cooligomer with theoretical number average molecular weight of 6000 g/mole. 3,4'-Oxydianiline (3,4'-ODA) (18.30 mmole, 3.6645 g), 1,3-bis (3-aminophenoxy)-benzene (APB) (18.30 mmole, 5.3497 g), benzophenone tetracarboxylic dianhydride (BTDA) (40.00 mmole, 12.8894 g), 4-(3-aminophenoxy)-4'-phenylethynyl-benzophenone (3-APEB) (6.80 mmole, 2.6482 g), and N-methylpyrollidinone (NMP) (98.2) were added to a 250 mL reaction kettle equipped with a mechanical stirrer, condenser, and nitrogen inlet. The reaction was stirred at 25° C. for 16 h to form the phenylethynyl-terminated polyamide followed by adding toluene (40 mL) and heating at 160° C. for 24 h. A yellow precipitate formed during the heating. After cooling, the precipitate was poured into water, washed in boiling methanol and dried at 110° C. for 72 h to afford a yellow solid in >95% yield. The final Tg of 230° C. was measured after 1 h at 371° C.

EXAMPLE 17

Synthesis of 100/0 4,4'-ODA/APB//BTDA with 3-APEB @ 6000 g/mole

The following example illustrates the synthesis of a phenylethynyl-terminated imide cooligomer with theoretical number average molecular weight of 6000 g/mole. 4,4'-Oxydianiline (4,4'-ODA) (36.884 mmole, 7.3859 g), benzophenone tetracarboxylic dianhydride (BTDA) (40.00 mmole, 12.8894 g), 4-(3-aminophenoxy)-4'-phenylethynylbenzophenone (3-APEB) (6.232 mmole, 2.4270 g), and N-methylpyrrollidinone (NMP) (90.9 g) were added to a 250 mL reaction kettle equipped with a mechanical stirrer, condenser and nitrogen inlet. The reaction was stirred at 25° C. for 16 h to form the phenylethynyl-terminated polyamide followed by adding toluene (40 mL) and heating at 160° C. for 24 h. A dark gel formed during the heating and a yellow precipitate formed upon cooling to 100° C. After cooling, the yellow precipitate was poured into water, washed in boiling methanol and dried at 110° C. for 72 h to afford a yellow solid in >95% yield. The final Tg was not detected but a Tm of 439° C. was measured after 1 h at 350° C.

EXAMPLE 18

Synthesis of 50/50 4,4'-ODA/APB//BTDA with 3-APEB @ 6000 g/mole

The following example illustrates the synthesis of a phenylethynyl-terminated imide cooligomer with theoretical number average molecular weight of 6000 g/mole. 4,4'-Oxydianiline (4,4'-ODA) (18.30 mmole, 3.6645 g), 1,3-bis(3-aminophenoxy)-benzene (APB) (18.30 mmole, 5.3497 g), benzophenone tetracarboxylic dianhydride (BTDA) (40.00 mmole, 12.8894 g), 4-(3-aminophenoxy)-4'-phenylethynyl-benzophenone (3-APEB) (6.80 mmole, 2.6482 g), and N-methylpyrrollidinone (NMP) (98.2) were added to a 250 mL reaction kettle equipped with a mechanical stirrer, condenser, and nitrogen inlet. The reaction was stirred at 25° C. for 16 h to form the phenylethynyl-terminated polyamide followed by adding toluene (40 mL) and heating at 160° C. for 24 h. The warm reaction mixture was poured into water, washed in boiling methanol and dried at 110° C. for 72 h to afford a yellow solid in >95% yield. The final Tg of 235° C. and the Tm of 414° C. was measured after 1 h at 371° C.

EXAMPLE 19

Synthesis of 50/50 3,4'-ODA/APB//PMDA with 3-APEB @ 6000 g/mole

The following example illustrates the synthesis of a phenylethynyl-terminated imide cooligomer with theoretical number average molecular weight of 6000 g/mole. 3,4'-Oxydianiline (3,4'-ODA) (18.622 mmole, 3.7290 g), 1,3-bis(3-aminophenoxy)-benzene (APB) (18.622 mmole, 5.4438 g), pyrromellitic dianhydride (PMDA) (40.00 mmole, 8.7249 g), 4-(3-aminophenoxy)-4'-phenylethynylbenzophenone (3-APEB) (5.512 mmole, 2.1466 g), and N-methylpyrrollidinone (NMP) (80 g) were added to a 250 mL reaction kettle equipped with a mechanical stirrer, condenser, and nitrogen inlet. The reaction was stirred at 25° C. for 16 h to form the phenylethynyl-terminated polyamide followed by adding toluene (40 mL) and heating at 160° C. for 24 h. A yellow precipitate formed upon cooling to 100° C. After cooling, the yellow precipitate was poured into water, washed in boiling methanol and dried at 110° C. for 72 h to afford a yellow solid in >95% yield. The final Tg of 260° C. was measured after 1 h at 371° C.

EXAMPLE 20

Synthesis of 25/75 3,4'-ODA/APB//PMDA with 3-APEB @ 6000 g/mole

The following example illustrates the synthesis of a phenylethynyl-terminated imide cooligomer with theoretical number average molecular weight of 6000 g/mole. 3,4'-Oxydianiline (3,4'-ODA) (9.275 mmole, 1.8573 g), 1,3-bis(3-aminophenoxy)-benzene (APB) (27.825 mmole, 8.1342 g), pyrromellitic dianhydride (PMDA) (40.00 mmole, 8.7249 g), 4-(3-aminophenoxy)-4'-phenylethynylbenzophenone (3-APEB) (5.800 mmole, 2.2588 g), and N-methylpyrrollidinone (NMP) (83.9 g) were added to a 250 mL reaction kettle equipped with a mechanical stirrer, condenser, and nitrogen inlet. The reaction was stirred at 25° C. for 16 h to form the phenylethynyl-terminated polyamide followed by adding toluene (40 mL) and heating at 160° C. for 24 h. A dark gel formed upon cooling to 100° C. After cooling, the gel was poured into water to form a yellow precipitate which was washed in boiling methanol and dried at 110° C. for 72 h to afford a yellow solid in >95% yield. The final Tg of 243° C. was measured after 1 h at 371° C.

EXAMPLE 21

Synthesis of 85/15 3,4'-ODA/APB//BPDA with PEPA @ 2500 g/mole

The following example illustrates the synthesis of a phenylethynyl-terminated imide cooligomer with theoretical number average molecular weight of 2500 g/mole. 3,4'-Oxydianiline (ODA) (0.2125 mole, 42.5523 g), 1,3-bis(3-aminophenoxy)benzene (APB) (0.0375 mole, 10.9625 g), 3,3',4,4'-biphenyl tetracarboxylic dianhydride (BPDA) (0.2069 mole, 60.8749 g), 4-phenylethynyl phthalic anhydride (PEPA) (0.0862 mole, 21.3983 g), and N-methylpyrrollidinone (NMP) (252 g) were added to a 1 L three neck flask equipped with a mechanical stirrer, condenser, and nitrogen inlet. The reaction was stirred at 25° C. for 16 h to form the phenylethynyl-terminated polyamide acid ($\eta_{inh}$=0.22 dL/g, NMP at 25° C.) followed by adding toluene (100 mL) and heating at 160° C. for 24 h. A yellow precipitate formed during the heating. After cooling, the reaction was poured into water, washed in boiling methanol and dried at 110° C. for 72 h to afford a yellow solid in >95% yield. The resulting phenylethynyl-terminated polyimide powder was insoluble in NMP at 25° C. The final Tg of 254° C. was measured after 1 h at 350° C. A film cast from the polyamide acid solution and cured 1 h at 350° C. was unaffected by MEK, toluene, jet fuel, and hydraulic fluid.

EXAMPLE 22

Synthesis of 85/15 3,4'-ODA/APB//BPDA with PEPA @ 10000 g/mole

The following example illustrates the synthesis of a phenylethynyl-terminated imide cooligomer with theoretical number average molecular weight of 10,000 g/mole. 3,4'-Oxydianiline (ODA) (0.2125 mole, 42.5523 g), 1,3-bis(3-aminophenoxy)benzene (APB) (0.0375 mole, 10.9625 g), 3,3',4,4'-biphenyl tetracarboxylic dianhydride (BPDA) (0.2385 mole, 70.1621 g), 4-phenylethynyl phthalic anhydride (PEPA) (0.02306 mole, 5.7245 g), and N-methylpyrrollidinone (NMP) (240 g) were added to a 1 L three neck flask equipped with a mechanical stirrer, condenser, and nitrogen inlet. The reaction was stirred at 25° C. for 16 h to form the phenylethynyl-terminated polyamide acid ($\eta_{inh}$=0.44 dL/g, NMP at 25° C.) followed by adding toluene (100 mL) and heating at 160° C. for 24 h. A yellow precipitate formed during the heating. After cooling, the yellow precipitate was poured into water, washed in boiling methanol and dried at 110° C. for 72 h to afford a yellow solid in >95% yield. The resulting phenylethynyl-terminated polyimide powder was insoluble in NMP at 25° C. The final Tg of 266° C. was measured after 1 h at 350° C. A film cast from the polyamide acid solution and cured 1 h at 350° C. was unaffected by MEK, toluene, jet fuel, and hydraulic fluid.

EXAMPLE 23

Preparation of Moldings

The following process was used to test the compression molding of the aforementioned examples. Dried powders of the polyimide copolymers (1 to 1.5 gram) were placed in either a 1 inch round stainless steel mold or a 1.25 inch square stainless steel mold which was placed in a preheated hydraulic press. For all phenylethynyl terminated copolymers, pressure was applied and the molds were heated to 350–371° C. For maleic and nadic anhydride terminated copolymers, the molds were heated to 316° C. and pressure was applied. The pressure and temperature were held constant for 1 hour. The results are presented in Table 2. "Poor processability" means inadequate flow and an unconsolidated molding. "Moderate processability" is slightly better than "poor." "Good processability" means a consolidated molding but little molding flash, and "very good processability" means a consolidated molding and significant molding flash. "Excellent processability" means a well consolidated molding with a lot of molding flash, indicating lower pressures would probably provide well consolidated, void free moldings. "Quality" indicates toughness of the molding and/or molding flash.

EXAMPLE 24

Preparation of Adhesive Tape

Solutions of several of the compositions in the Examples, i.e. 20–40% solids in NMP, were used to prepare adhesive tapes as follows. The solutions were applied to style 112, A1100 finish E-glass cloth which had been dried for 0.5 hours in a forced air oven. Said coated cloths were air dried 1 hour each at 100, 175 and 225° C. between application of subsequent coats. This procedure was continued until a nominal thickness of 0.012 inch was obtained. The area to be bonded was coated (primed) on each adherend with a dilute solution (~5% solids) of the same composition as the adhesive tape and air dried 1 hour each at 100, 175 and 225° C. prior to bonding with the adhesive tape.

EXAMPLE 25

Adhesive Bonding

The prepared adhesive tapes from Example 24 were cut into strips sufficient to cover the bond area so as to give a 0.5 inch overlap for surface-treated (Pasa Jell 107) titanium alloy (Ti-6Al-4V) four fingered panel adherends. Each tape was placed between the overlapped panels and the specimens were assembled in a bonding jig in such a manner as to hold the specimens securely while being bonded. The assembly was placed in a hydraulic press and 25 to 200 psi pressure was applied. The temperature, monitored by a thermocouple, was increased from room temperature to 371° C. during ~45 minutes and held for 1 hour while pressure was maintained. The heat was turned off and the press was allowed to cool under pressure to <150° C. The bonded panel was removed from the press and jig and the individual specimens were separated with a metal shearer. The lap shear strengths were determined according to the procedure for ASTM-1002. Results are given in Tables 5–8.

EXAMPLE 26

Preparation of Graphite Fiber with Polymer Coating

A solution of polymer from Examples 2 and 8 were coated onto continuous graphite fiber (Hercules, Inc., IM-7). After coating, the wet fiber was dried in ovens to remove most of the solvent and convert the poly(amide) acid to polyimide. The polymer-solids-to-graphite-fiber ratio was approximately one to two. This prepreg was held for composite fabrication.

EXAMPLE 27

Preparation of Graphite Fiber Reinforced Composite

The prepreg from Example 26 was cut into three-inch square pieces and placed in a three inch by three inch matched-metal-die mold with the fiber all aligned in the same direction (unidirectional). Ten plies of the prepreg were stacked in this manner and the mold was placed in a heated hydraulic press. The mold was heated to 225° C. for 1 hour, then heated to 371° C. with 250 psi pressure applied after 5 minutes at 371° C. and held for 1 hour at 371° C. After cooling to ambient conditions, the pressure was released and a well consolidated composite part was removed from the mold. The resin content of the molded composite was calculated to be approximately 33 percent.

EXAMPLE 28

Measurement of Melt Viscosity and Melt Stability

The polyimide copolymers were subjected to melt rheology measurements using the Rheometrics System IV rheometer. This technique indicates that these copolymers have low melt viscosities and good melt stabilities when heated to and held at the temperatures necessary to process into useful parts. Data from the rheometer for minimum melt viscosity of several polymers is presented in Table 10. The minimum melt viscosity in poise is shown for a sample heated from RT to 371° C. at 4° C./min and held at 371° after an initial drying of ~2 hours at ~240° C. under vacuum. Table 11 shows the melt viscosity and stability of one phenylethynyl terminated copolymer at various temperatures and hold times.

EXAMPLE 29

Preparation of Glass Coating

The phthalamide acid-terminated polyamide acid solutions were poured onto glass plates and spread to a uniform thickness using a doctors blade with a preset gap. After drying to a tack free form in a dust free atmosphere, the polymers were heated 1 hour each at 100, 200, and either 316 or 350° C. to form a polyimide coating with high adhesion to the glass plate.

EXAMPLE 30

Preparation of Wire Coating

Steel and copper wires were dipped into the phthalamide acid-terminated polyamide acid solutions and removed to form a polymer/solvent coating on the wires. After drying to a tack free form in a dust free atmosphere, the polymers were heated 1 hour each at 100, 200 and either 316 or 350° C. to form a tough, flexible, polyimide coating with high adhesion to the steel or copper wire.

TABLE 1

Properties of Copolymers.

| Copolymer Terminated with Reactive Groups | Theoretical Molecular Weight, Mn | Inherent Viscosity[1], ηinh, dL/g | Glass Transition Temperature[2], Tg (Tm)(° C.) |
|---|---|---|---|
| Example 1 | 5000 | 0.31 | 252 |
| Example 2 | 5000 | 0.31 | 251 |
| Example 3 | 5000 | 0.30 | 243 |
| Example 4 | 5000 | 0.28 | 236 |
| Example 5 | 5000 | 0.30 | 231 |
| Example 6 | 5000 | 0.28 | 229 |
| Example 7 | 5000 | 0.33 | 280(378) |
| Example 8 | 5000 | 0.29 | 263 |
| Example 9 | 5000 | 0.29 | 252 |
| Example 10 | 9200 | 0.40 | 262 |
| Example 11 | 9200 | 0.42 | 264 |
| Example 12 | 9000 | 0.38 | 267 |
| Example 13 | 9000 | 0.38 | 248 |
| Example 14 | 9000 | 0.35 | 235 |
| Example 15 | 6000 | 0.29 | (405) |
| Example 16 | 6000 | 0.31 | 230 |
| Example 17 | 6000 | 0.55 | (439) |
| Example 18 | 6000 | 0.34 | 235 |
| Example 19 | 6000 | 0.30 | 260 |
| Example 20 | 6000 | 0.34 | 243 |
| Example 21 | 2500 | 0.22 | 254 |
| Example 22 | 10000 | 0.44 | 266 |

[1]NMP at 25° C.
[2]DSC at a heating rate of 20° C./min. Examples 1–9 cured 1 hour at 350° C., examples 10–11 cured 1 hour at 316° C. and examples 12–22 cured 1 hour at 371° C.

TABLE 2

Processability of Copolymers.[1]

| Copolymer Terminated with Reactive Groups | Theoretical Molecular Weight, Mn | Pressure (psi) | Processability/ Quality |
|---|---|---|---|
| Example 1 | 5000 | 200 | moderate/tough |
| Example 2 | 5000 | 150 | good/tough |
| Example 3 | 5000 | 150 | very good/tough |
| Example 4 | 5000 | 150 | excellent/tough |
| Example 5 | 5000 | 150 | excellent/tough |
| Example 6 | 5000 | 150 | excellent/tough |
| Example 7 | 5000 | 200 | poor/brittle |
| Example 8 | 5000 | 150 | very good/tough |
| Example 9 | 5000 | 150 | excellent/tough |
| Example 10 | 9200 | 200 | good/tough |
| Example 11 | 9200 | 200 | good/tough |
| Example 12 | 9000 | 200 | poor/tough |
| Example 13 | 9000 | 200 | good/tough |
| Example 14 | 9000 | 50 | excellent/tough |
| Example 15 | 6000 | 200 | poor/tough |
| Example 16 | 6000 | 200 | very good/tough |
| Example 17 | 6000 | 200 | poor/tough |
| Example 18 | 6000 | 200 | very good/tough |
| Example 19 | 6000 | 200 | moderate/tough |
| Example 20 | 6000 | 50 | excellent/tough |
| Example 21 | 2500 | 50 | excellent/tough |
| Example 22 | 10000 | 250 | poor/tough |

[1]See Example 23.

TABLE 3

Thin Film Properties of Copolymers.

| Copolymer Terminated with Reactive Groups | Test Temperature, ° C. | Tensile Strength, Ksi | Tensile Modulus, Ksi | Elongation, % |
|---|---|---|---|---|
| Example 2 | 25 | 16.8 | 470 | 5.3 |
|  | 177 | 11.0 | 385 | 7.5 |
| Example 8 | 25 | 18.8 | 455 | 32 |
|  | 177 | 12.2 | 332 | 83 |
| Example 22 | 25 | 18.6 | 492 | 15 |
|  | 177 | 10.2 | 301 | 61 |

[1]Theoretical molecular weight in g/mole.

TABLE 4

Fracture Toughness and Energy.

| Copolymer Terminated with Reactive Groups | Fracture toughness, psi × in½ | Fracture energy, in-lbs/ in² |
|---|---|---|
| Example 2 | 3400 | 25 |
| Example 8 | 3550 | 28 |
| Example 22 | 3900 | 31 |

[1]Theoretical molecular weight in g/mole.

TABLE 5

Adhesive Properties[1] of Example 2 Bonded 1 h at 350° C. under 100 psi.

| Test Temp, ° C. | Exposure, hours at 177° C. | Tensile Shear Strength, psi |
|---|---|---|
| RT | none | 6100 |
| 177° C. | none | 4500 |
| 204° C. | none | 3770 |
| 177° C. | 1000 | 4675 |
| 177° C. | 3000 | 4270 |
| 177° C. | 5000 | 4320 |
| 177° C. | 10000 | 4370 |

[1]See Examples 24 and 25.

TABLE 6

Adhesive Properties[1] of Example 8 Bonded 1 h at 350° C. under 75 psi.

| Test Temp, ° C. | Exposure | Tensile Shear Strength, psi |
|---|---|---|
| RT | none | 7630 |
| 177° C. | none | 5000 |
| 204° C. | none | 3770 |
| 177° C. | 1000 hours @ 177° C. | 4340 |
| 177° C. | 5000 hours @ 177° C. | 4330 |
| RT | 48 hour in MEK | 5470 |
| RT | 48 hour in Jet Fuel | 6975 |
| RT | 48 hour in Hydraulic Fluid | 4700 |
| RT | 48 hour Water Boil | 4590 |

[1]See Examples 24 and 25.

TABLE 7

Adhesive Properties[1] of Example 8, Example 21, and Example 22 of at Various Cure Conditions Bonded at 75 psi.

| Example 21 | Tensile Shear Strength, psi | |
|---|---|---|
| Cure Condition | RT | 177° C. |
| 1 hr @ 350 | 5470 | 4520 |

TABLE 7-continued

Adhesive Properties[1] of Example 8, Example 21, and Example 22 of at Various Cure Conditions Bonded at 75 psi.

| | | |
|---|---|---|
| 1 hr @ 375 | 5760 | 4330 |
| ½ hr @ 325, then ½ hr @ 375 | 6490 | 4720 |
| 2 hr @ 316 | 6460 | 5100 |
| Example 8 | Tensile Shear Strength, psi | |

| Cure Condition | RT | 177° C. |
|---|---|---|
| 1 hr @ 350 | 7630 | 5000 |
| 1 hr @ 375 | 5290 | 3840 |
| ½ hr @ 325, ½ hr @ 375 | 6370 | 3710 |
| 2 hr @ 316 | 5130 | 4970 |
| Example 22 | Tensile Shear Strength, psi | |

| Cure Condition | RT | 177° C. |
|---|---|---|
| 1 hr @ 350 | 4260 | 2840 |
| 1 hr @ 375 | N/A | 3160 |
| ½ hr @ 325, ½ hr @ 375 | 4260 | 3050 |
| 2 hr @ 316 | 4250 | 3830 |

[1]See Examples 24 and 25.

TABLE 8

Effects of Processing Pressure on Adhesive Properties[1] of Examples 21 and 22 Bonded at 350° C. for 1 Hour.

| Copolyimide | Processing Pressure, psi | Tensile Shear Strength, psi |
|---|---|---|
| Example 21 (2500 g/mole theoretical MW) | 75 | 5470 |
| | 25 | 6030 |
| Example 22 (10000 g/mole theoretical MW) | 75 | 4260 |
| | 100 | 6350 |
| | 200 | 6380 |

[1]See Examples 24 and 25.

TABLE 9

Composite Properties of Copolymers Terminated with Reactive Groups.[1]

| Copolymer Terminated with Reactive Groups | Test Temp., ° C. | Short Beam Shear, Strength,[2] Ksi | Flex Strength,[2] Ksi | Flex Modulus,[2] Msi | Open Hole Compression Strength,[3] Ksi |
|---|---|---|---|---|---|
| Example 2 | 25 | 16.4 | 268 | 23 | |
| | 177 | 10.2 | 190 | 22 | |
| Example 8 | 25 | 15.5 | 259 | 21 | 62 |
| | 93 | 14.2 | 264 | 22 | |
| | 150 | 11.7 | 225 | 21 | |
| | 177 | 9.1 | 209 | 19 | 46 |

[1]Composites processed at 250 psi and 371° C.
[2]Unidirectional specimen layup.
[3]Specimen layup: [± 45/90/0/0/ ± 45/0/0/ ± 45/0]$_s$.

TABLE 10

Minimum Melt Viscosity[1] of Several Copolyimides.

| Copolymer Terminated with Reactive Groups | Minimum Melt Viscosity, Poise |
|---|---|
| Example 13 | 1.8 × 10$^4$ |
| Example 14 | 4.0 × 10$^3$ |
| Example 15 | Remained Solid-Like |
| Example 16 | 3.8 × 10$^3$ |
| Example 17 | 8.0 × 10$^4$ |
| Example 18 | 1.9 × 10$^4$ |
| Example 19 | Remained Solid-Like |
| Example 20 | 1.8 × 10$^3$ |

[1]See Example 28.

TABLE 11

Melt Viscosity[1] of Example 8 at Various Temperatures and Hold Times.

| Temperature, ° C. | Melt Viscosity, Poise |
|---|---|
| 300 | 1.2 × 10$^6$ |
| 320 | 9.7 × 10$^5$ |
| 340 | 4.5 × 10$^5$ |
| 360 | 3.4 × 10$^4$ |
| 371 | 8.3 × 10$^3$ |
| 371, after 10 min | 1.2 × 10$^5$ |
| 371, after 20 min | 3.0 × 10$^5$ |

[1]See Example 28.

What is claimed is:

1. A method to increase the processability of polyimides, which comprises:

reacting 1,3-bis(3-aminophenoxy)benzene with a high melt viscosity polyimide made from a diamine and a dianhydride, and terminating the reaction with an effective amount of a reactive endcapper.

2. The method to increase the processability of polyimides as in claim 1 wherein said diamine is selected from the group comprising 3,4'-oxydianiline or 4,4'-oxydianiline.

3. The method to increase the processability of polyimides as in claim 1 wherein said dianhydride is selected from the group comprising 3,3',4,4'-biphenylcarboxylic dianhydride, benzophenone tetracarboxylic dianhydride, or pyrromellitic dianhydride.

4. The method to increase the processability of polyimides as in claim 1 wherein said reactive endcapper is selected from the group comprising 4-phenylethynyl phthalic anhydride, 3-aminophenoxy-4'-phenylethynylbenzophenone, maleic anhydride, or nadic anhydride.

5. The method to increase the processability of polyimides as in claim 1 wherein the mixture of said diamine and 1,3-bis(3-aminophenoxy)benzene has a ratio of said diamine to 1,3-bis(3-aminophenoxy)benzene within the range of about 1:99 to about 99:1.

6. The method to increase the processability of polyimides as in claim 5 wherein said ratio of said diamine to 1,3-bis(3-aminophenoxy)benzene is within the range of about 10:90 to about 90:10.

7. The method to increase the processability of polyimides as in claim 1 wherein the polyimide has a number average molecular weight within the range of about 1,000 to 15,000 g/mole.

8. The method to increase the processability of polyimides as in claim 7 wherein the polyimide has a number average molecular weight within the range of about 2,500 to 10,000 g/mole.

* * * * *